(12) United States Patent
Yu

(10) Patent No.: US 8,740,414 B2
(45) Date of Patent: Jun. 3, 2014

(54) LAMP

(75) Inventor: Henry Yu, Taichung (TW)

(73) Assignee: Veeled Incorporation, Taichung (TW)

( * ) Notice: Subject to any disclaimer, the term of this patent is extended or adjusted under 35 U.S.C. 154(b) by 0 days.

(21) Appl. No.: 13/395,127

(22) PCT Filed: Jan. 11, 2011

(86) PCT No.: PCT/CN2011/000046
§ 371 (c)(1),
(2), (4) Date: Nov. 15, 2012

(87) PCT Pub. No.: WO2011/082663
PCT Pub. Date: Jul. 14, 2011

(65) Prior Publication Data
US 2013/0051028 A1 Feb. 28, 2013

(30) Foreign Application Priority Data

Jan. 11, 2010 (CN) ...................... 2010 2 0001923 U

(51) Int. Cl.
*F21V 9/00* (2006.01)

(52) U.S. Cl.
USPC ...................................... 362/293; 362/249.02

(58) Field of Classification Search
USPC .................. 362/249.02, 293, 310, 311.02
See application file for complete search history.

(56) References Cited

U.S. PATENT DOCUMENTS

| | | | | |
|---|---|---|---|---|
| 7,819,556 B2 * | 10/2010 | Heffington et al. | ........... | 362/294 |
| 7,923,741 B1 * | 4/2011 | Zhai et al. | ........ | 257/98 |
| 8,052,308 B2 * | 11/2011 | Kamijima | ..... | 362/293 |
| 8,052,320 B2 * | 11/2011 | Hamada | ........ | 362/622 |
| 8,192,057 B2 * | 6/2012 | Dassanayake et al. | .. | 362/296.08 |
| 8,376,577 B2 * | 2/2013 | Harbers et al. | ........... | 362/249.02 |

* cited by examiner

Primary Examiner — Peggy Neils
(74) Attorney, Agent, or Firm — CKC & Partners Co., Ltd.

(57) ABSTRACT

A lamp includes a dichroic filter, a light emitting diode, and a lampshade. The light emitting diode emits light towards the dichroic filter. One portion of the light within a predetermined frequency range passes through the dichroic filter. The other portion of the light is refracted by the dichroic filter. The lampshade is used for shading the light. Therefore, the lampshade shows two colors of light.

4 Claims, 8 Drawing Sheets

1
LAMP

CROSS-REFERENCE TO RELATED APPLICATION

This application claims priority to PCT Application No. PCT/CN2011/000046, filed Jan. 11, 2011, which claims priority to CN Application No. 201020001923.6, filed Jan. 11, 2010.

BACKGROUND

1. Technical Field

The present disclosure relates to an illuminating device. More particularly, the present disclosure relates to a lamp.

2. Description of Related Art

A lamp is not only used for illumination but also for decoration. A conventional skill of using the lamp for decoration is to irradiate light on a lampshade, such that the light becomes the same color as the lampshade after passing through the lampshade. The colors of the light emitted from the lamp are dependent on how many colors the lampshade has.

Another conventional skill of using the lamp for decoration is to allow light to pass through a color filter for generating the light of the same color as the color filter. However, this conventional skill can only generate monochromatic lamplight.

SUMMARY

According to one embodiment of the present disclosure, a lamp is used to emit more than one color of light. The lamp includes a dichroic filter, a light emitting diode (LED) and a lampshade. The light emitting diode emits light towards the dichroic filter, and the lampshade surrounds the dichroic filter and the light emitting diode, thereby generating more than one color of light on the lampshade.

According to another embodiment of the present disclosure, a lamp is used to emit more than one color of light. The lamp includes a dichroic filter, a light emitting diode and a projection screen. The light emitting diode emits light towards the dichroic filter, and the projection screen is located at one side of the dichroic filter, thereby generating more than one color of light on the projection screen.

According to another embodiment of the present disclosure, a lamp is used to emit more than one color of light. The lamp includes a dichroic filter, a light emitting diode, and a lampshade. The light emitting diode emits light towards the dichroic filter, wherein one portion of the light within a predetermined frequency range passes through the dichroic filter, and the other portion of the light outside the predetermined frequency range is refracted by the dichroic filter. The light passing through the dichroic filter and the light refracted thereby both irradiate on the lampshade, thereby generating more than one color of light on the lampshade.

| MAJOR SYMBOLS | |
|---|---|
| 100: | dichroic filter |
| 200: | light emitting diode |
| 210: | first light |
| 220: | second light |
| 230: | third light |
| 240: | fourth light |
| 300: | lampshade |
| 310: | first position |
| 320: | second position |
| 400: | projection screen |
| 410: | first position |
| 420: | second position |
| 500: | outer shell |
| 510: | base |
| 520: | cover plate |
| 530: | heat sink |
| 540: | terminal |
| 600: | reflector |

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
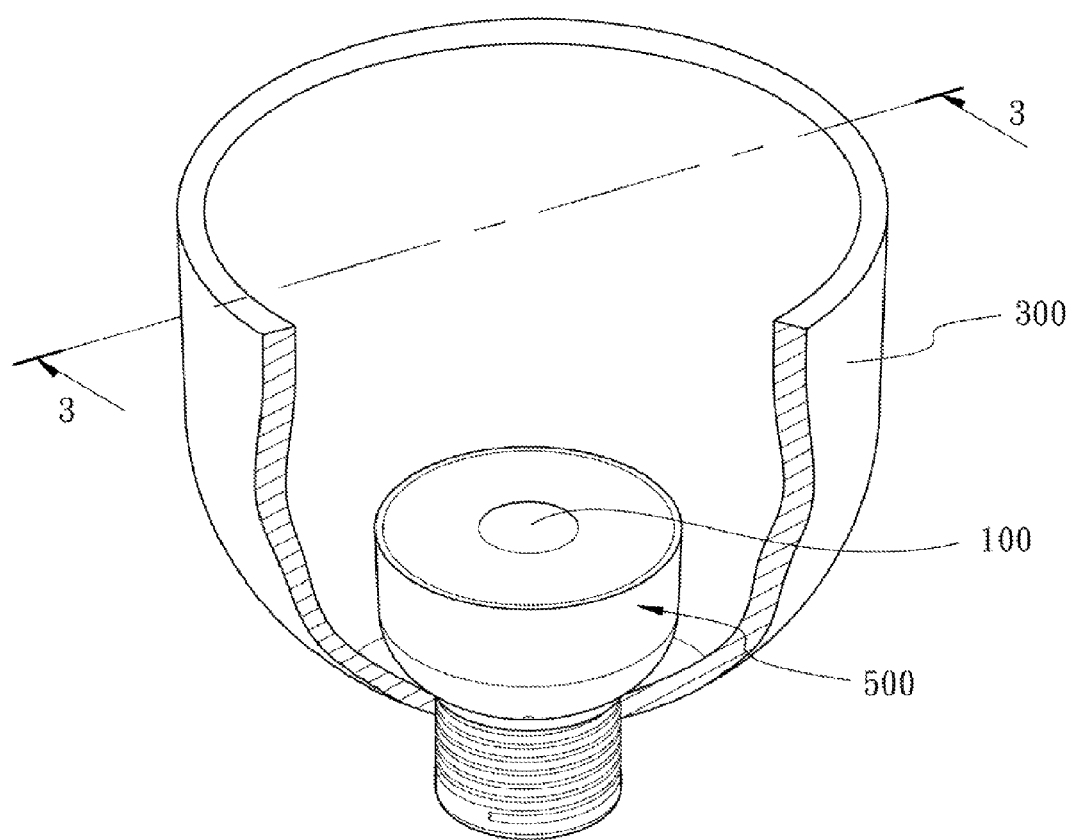
FIG. 1 is a three-dimensional view of a lamp according to one embodiment of the present disclosure.
Figure 2:
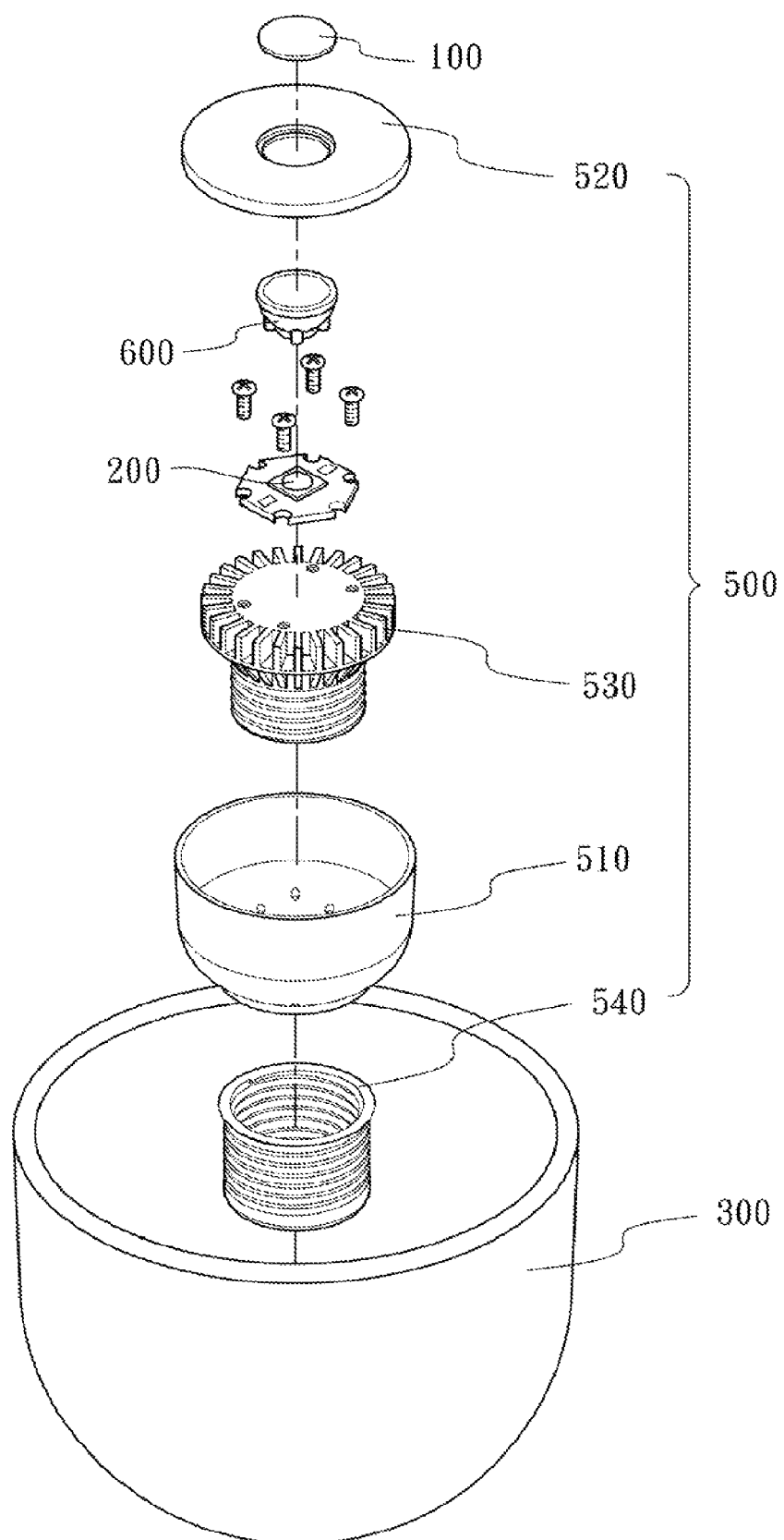
FIG. 2 is an exploded view of the lamp of FIG. 1.

FIG. 1 is a three-dimensional view of a lamp according to one embodiment of the present disclosure. FIG. 2 is an exploded view of the lamp of FIG. 1. In this embodiment, the lamp includes a dichroic filter 100, a light emitting diode 200 and a lampshade 300. The light emitting diode 200 emits light towards the dichroic filter 100. The lampshade 300 surrounds the dichroic filter 100 and the light emitting diode 200.

In detail, the lamp further includes an outer shell 500. The outer shell 500 includes a base 510, a cover plate 520, a heat sink 530, and a terminal 540. The cover plate 520, heat sink 530, and the terminal 540 are respectively connected to the base 510. The light emitting diode 200 is disposed on the heat sink 530. The dichroic filter 100 is disposed on the cover plate 520. The lampshade 300 is disposed on the base 510.

Figure 3:
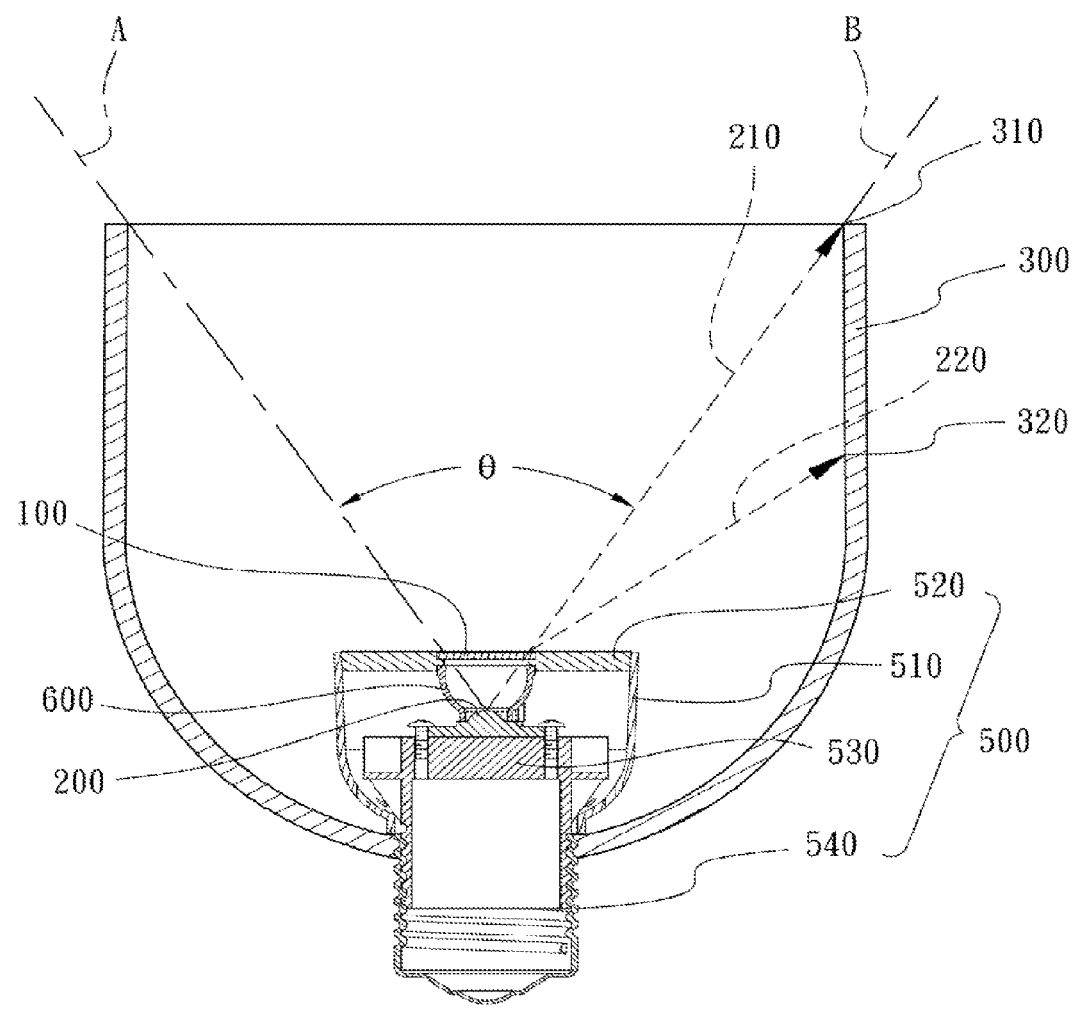
FIG. 3 is a cross-sectional view viewed along line 3-3 of FIG. 1.

FIG. 3 is a cross-sectional view viewed along line 3-3 of FIG. 1. In other words, the light emitting diode 200 emits light towards the dichroic filter 100. One portion of the light within a predetermined frequency range passes through the dichroic filter 100. The other portion of the light outside the predetermined frequency range is refracted by the dichroic filter 100. Both portions of the light irradiate on the lampshade 300.

In detail, the light emitting diode 200 emits light towards the dichroic filter 100 after being powered on. One portion of the light within a predetermined frequency range, namely a first light 210, passes through the dichroic filter 100 and is projected on a first position 310 of the lampshade 300. The other portion of the light outside the predetermined frequency range, namely a second light 220, is refracted by the dichroic filter 100 and projected on a second position 320 of the lampshade 300. The two lights 210 and 220 have different colors because the two lights 210 and 220 have different frequency range, such that two different colors of light can be generated on the lampshade 300.

The term "predetermined frequency range" means a range of wave frequencies determined by the dichroic filter 100. The light within the predetermined frequency range passes through the dichroic filter 100. Otherwise, the light outside the predetermined frequency range is refracted by the dichroic filter 100. The frequency range of the dichroic filter 100 is determined by design. Therefore, the frequency range of the dichroic filter 100 is predetermined. For instance, blue light and green light (wavelength 525 nm) may pass through the dichroic filter 100 and the light of other colors are refracted by the dichroic filter 100, if the predetermined frequency range is 465 nm to 525 nm. For another instance, the green light of which the wavelength>525 nm may pass through the dichroic filter 100 and the other green light of which the wavelength>550 nm and the light with other wavelengths are refracted by the dichroic filter 100, when the predetermined frequency range is 525 nm to 550 nm. Based on the foregoing, the dichroic filter 100 may have different predetermined frequency ranges with different design.

Furthermore, when the second light 220 irradiates the second position 320 of the lampshade 300, more than one color of light can be generated. For instance, most of the green light can pass through the dichroic filter 100 when the predetermined frequency range is 560 nm to 490 nm. Therefore, the color of the first light 210 at the first position 310 is green. The second light 220 is refracted by the dichroic filter 100. The color of the second light 220 at the second position 320 can be any color but green. Furthermore, the second light 220 is split and projected on the lampshade 300 when the second light 220 is refracted by the dichroic filter 100. The second light 220 may display more than one color, such as red, blue, or other colors, except green, at the second position 320 of the lampshade 300, when the second light 220 is composed of at least two lights with different colors.

Figure 4:
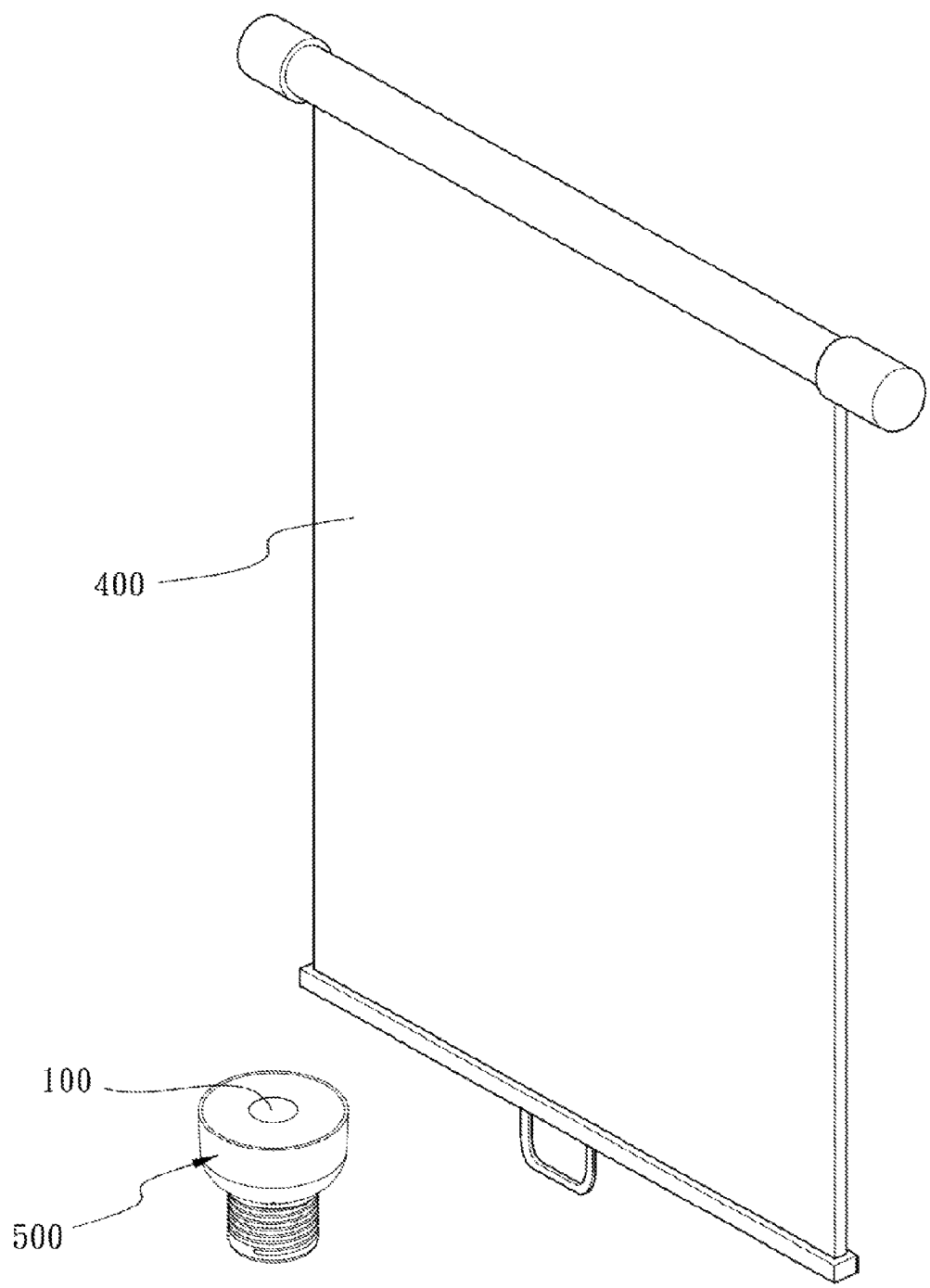
FIG. 4 is a three-dimensional view of a lamp according to another embodiment of the present disclosure.
Figure 5:
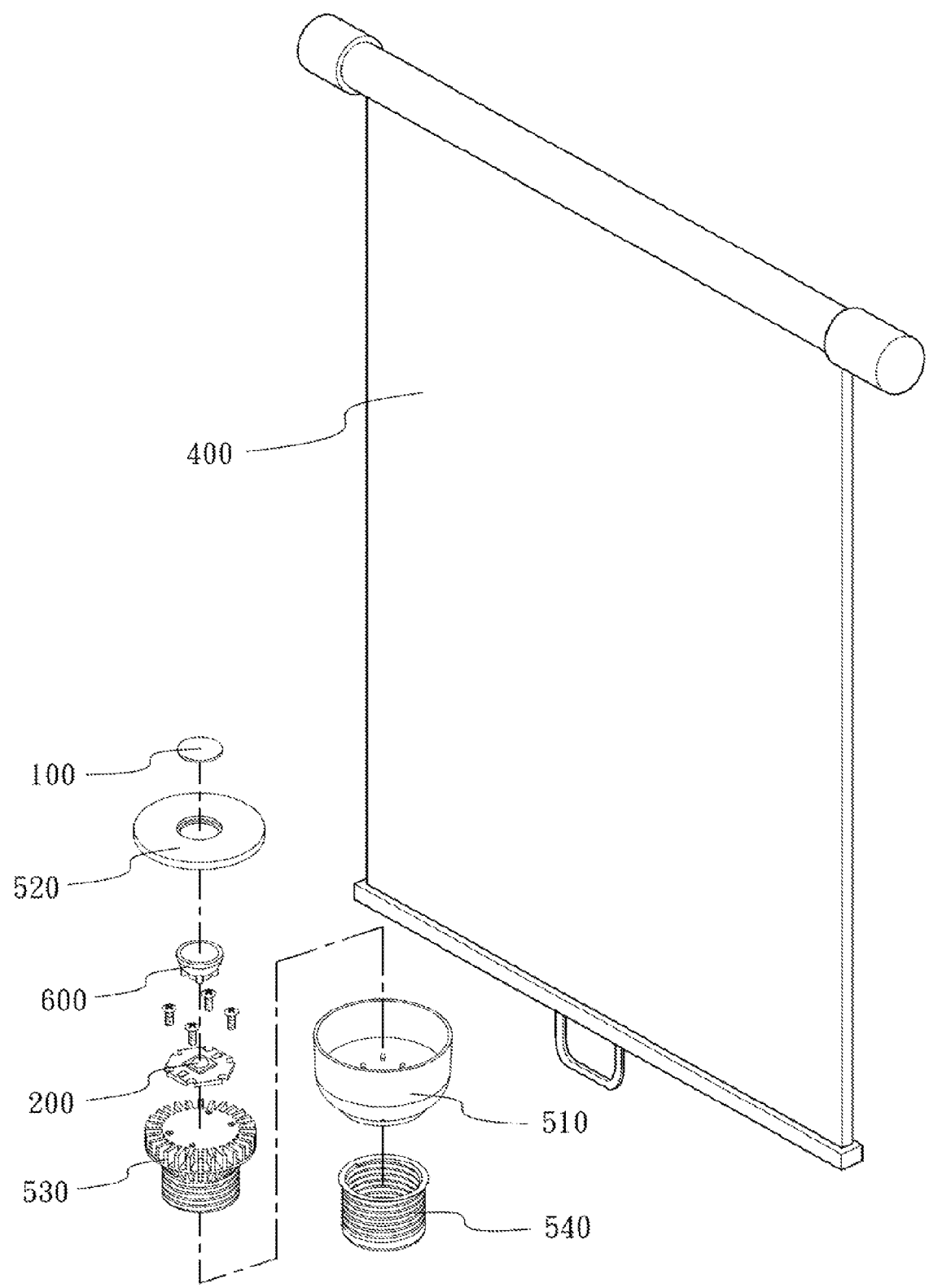
FIG. 5 is an exploded view of the lamp of FIG. 4.

FIG. 4 is a three-dimensional view of a lamp according to another embodiment of the present disclosure. FIG. 5 is an exploded view of the lamp of FIG. 4. In this embodiment, the lamp includes a dichroic filter 100, a light emitting diode 200, and a projection screen 400. The light emitting diode 200 emits light towards the dichroic filter 100. The projection screen 400 is located at one side of the dichroic filter 100.

In detail, the lamp further includes an outer shell 500. The outer shell 500 includes a base 510, a cover plate 520, a heat sink 530, and a terminal 540. The cover plate 520, heat sink 530, and the terminal 540 are respectively connected to the base 510. The light emitting diode 200 is disposed on the heat sink 530. The dichroic filter 100 is disposed on the cover plate 520. The projection screen 400 is positioned at wall, ceiling, or frame.

Figure 6:
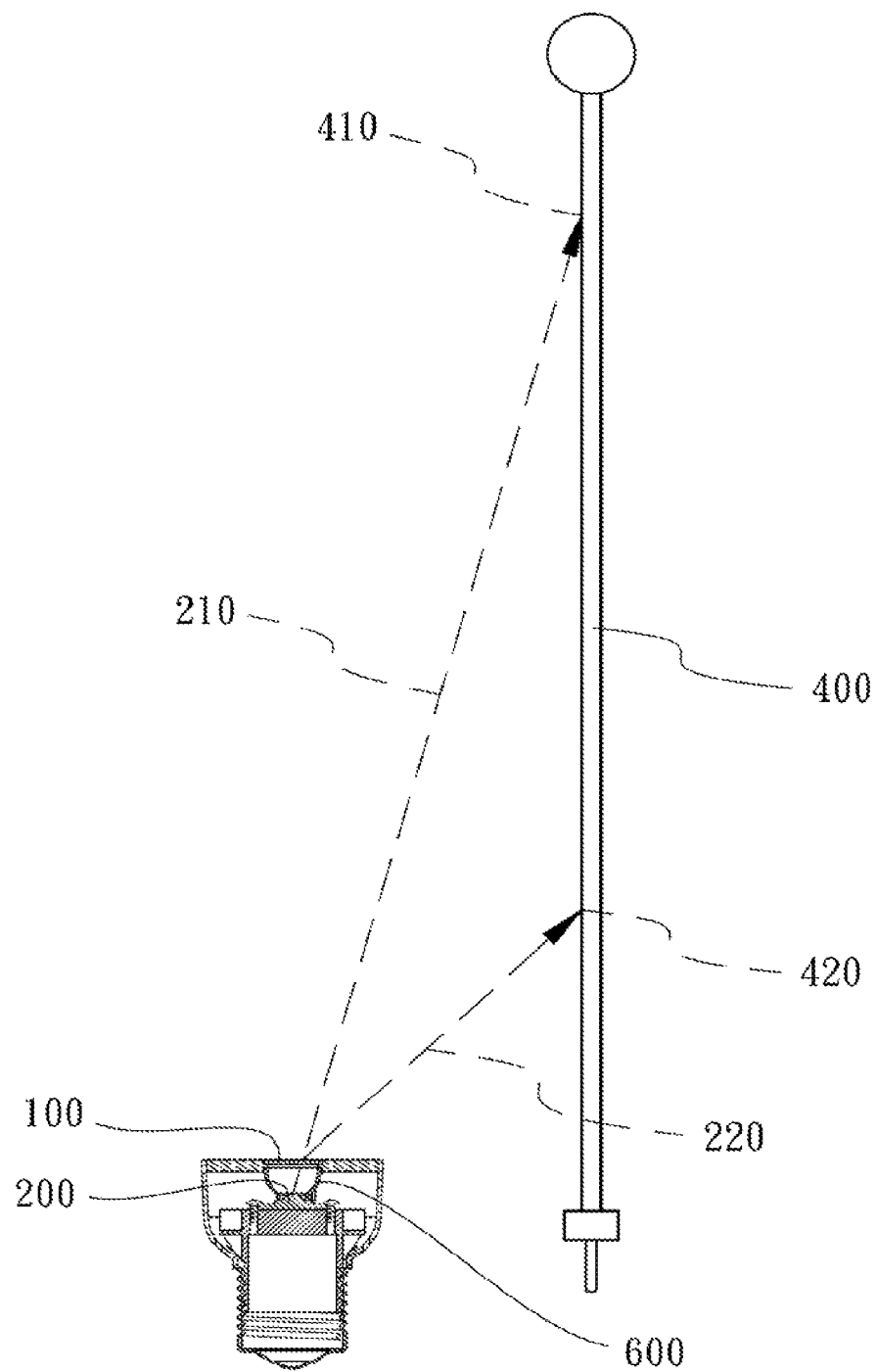
FIG. 6 is a side view of the lamp of FIG. 4, wherein a light emitting diode emits light towards a projection screen.

FIG. 6 is a side view of the lamp of FIG. 4, wherein the light emitting diode 200 emits light towards the projection screen 400. In detail, the first light 210 passes through the dichroic filter 100. The second light 220 is refracted by the dichroic filter 100. The first light 210 is projected on a first position 410 of the projection screen 400. The second light 220 is projected on a second position 420 of the projection screen 400. Therefore, two different colors of light can be generated on the lampshade 300.

As shown in FIG. 3 and FIG. 6, the light further includes a reflector 600. The reflector 600 surrounds the light emitting diode 200 for reflecting the light forward. A viewable angle of the light reflected by the reflector 600 is substantially from 30 degrees to 90 degrees. The display of the second light 220 is clearer on the lampshade 300 or the projection screen 400 when the viewable angle of the light is in the said range.

The term "viewable angle" means the angle viewed from the side of the light. For instance, the light emitted from the light emitting diode 200 and reflected by the reflector 600 is a sector viewed from the side of the light. Therefore, the angle between two straight lines of the sector is the viewable angle of the light.

Figure 7:
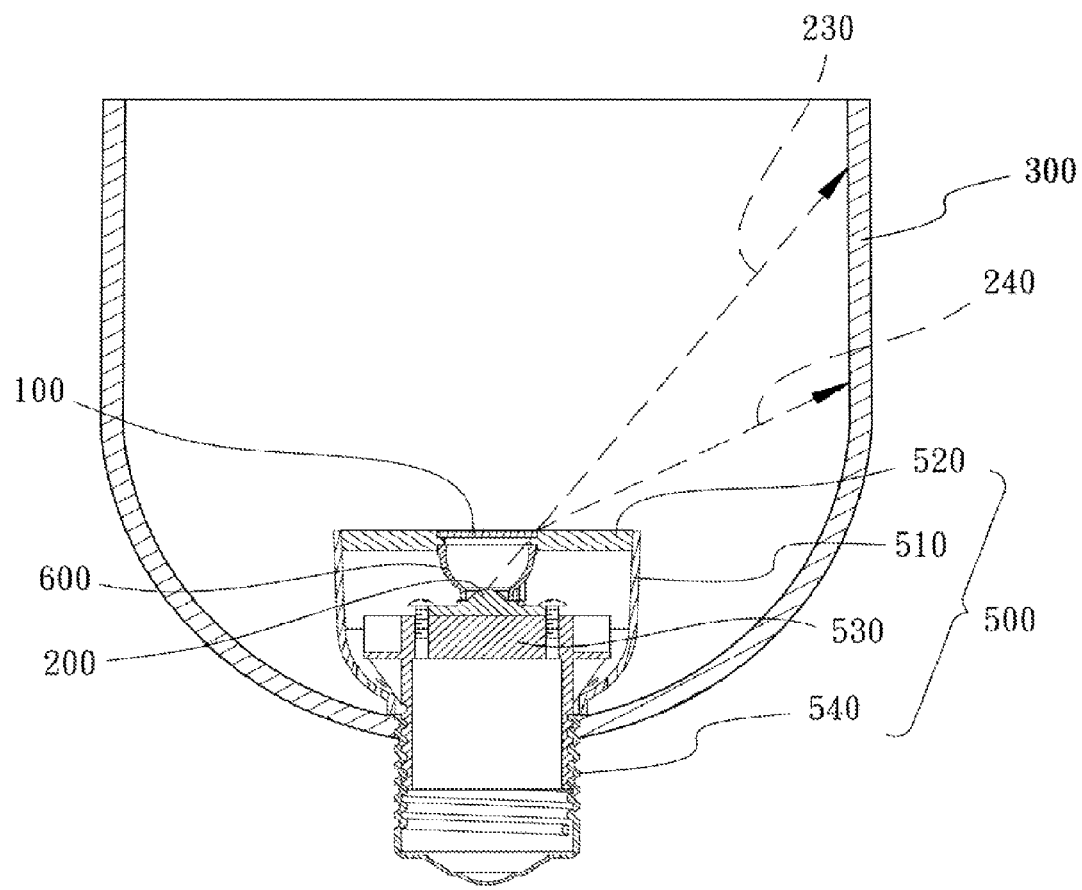
FIG. 7 illustrates the lamp of FIG. 3, wherein the viewable angle of the light emitted by a light emitting diode is 90 degrees.

FIG. 7 illustrates the lamp of FIG. 3. The viewable angle of the light emitted by the light emitting diode 200 is 90 degree. The light emitting diode 200 emits a third light 230 and a fourth light 240 at the max viewable angle. The third light 230 is within the predetermined frequency range. The fourth light 240 is outside the predetermined frequency range. The place of the lampshade 300 between the positions, where the third light 230 and the fourth light 240 irradiate, has clearer color.

Figure 8:
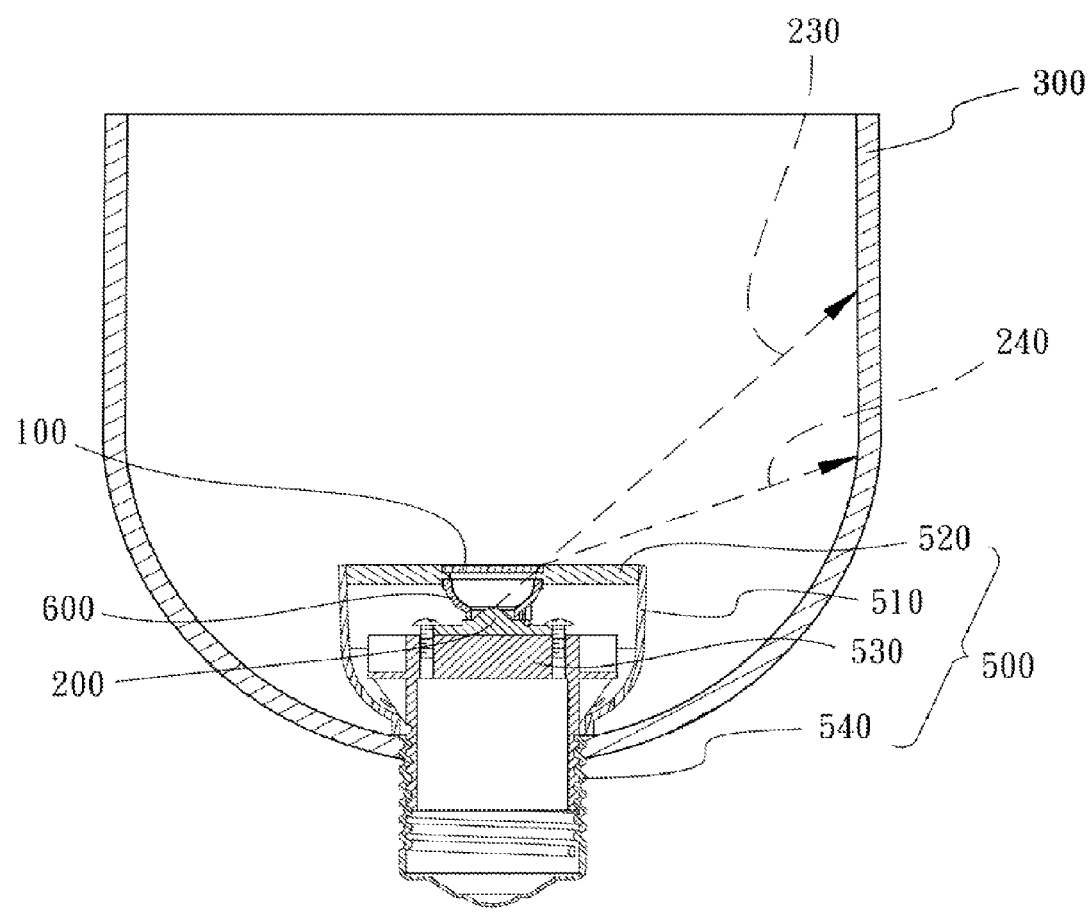
FIG. 8 illustrates the lamp of FIG. 3, wherein the viewable angle of the light emitted by a light emitting diode is 120 degrees.

FIG. 8 illustrates the lamp of FIG. 3. The viewable angle of the light emitted by the light emitting diode 200 is 120 degrees. The positions, where the third light 230 and the fourth light 240 irradiate, are moved when the viewable angle is changed. However, the place of the lampshade 300 between the said positions is decreased when the viewable angle increases.

Therefore, the place having clearer color is decreased when the viewable angle increases, and the place is increased when the viewable angle decreases. Thus, the place has an appropriate size when the viewable angle is substantially from 30 degrees to 90 degrees.

Furthermore, the first light 210 and the second light 220 of the lamp can prove the growth of the plants. Therefore, the lamp can be used for decoration and illuminating the plants.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A lamp, comprising:
    a dichroic filter;
    a substrate having a top surface, and a bottom surface opposite to the top surface;
    a light emitting diode for emitting light towards the dichroic filter, wherein, the light emitting diode is disposed on the top surface of the substrate;
    a reflector being tube-shaped and having first and second open ends, wherein the first open end is disposed on the top surface of the substrate surrounding the light emitting diode, and the second open end is spaced apart from the top surface of the substrate, the reflector reflecting the light emitted by the light emitting diode; and
    a lampshade surrounding the dichroic filter and the light emitting diode;
    wherein one portion of the light that is emitted by the light emitting diode, reflected by the reflector, and within a predetermined frequency range is passed through the dichroic filter;
    wherein another portion of the light that is emitted by the light emitting diode, reflected by the reflector, and outside the predetermined frequency range is refracted by the dichroic filter;
    wherein the portion of the light that is passed through the dichroic filter exits from the second open end of the reflector having a viewable angle that is substantially from 30 degrees to 90 degrees, wherein the viewable angle is an angle between two extremes of a sector formed by the light when viewing the lamp from the side, wherein the two extremes of the sector formed by the light irradiate on the lampshade at a first predetermined height on the lampshade;

wherein the other portion of the light that is refracted by the dichroic filter exits from the second open end of the reflector and irradiates on the lampshade at a second predetermined height thereon, wherein the first predetermined height is a greater distance from the top surface of the substrate than the second predetermined height.

2. A lamp, comprising:

a dichroic filter;

a substrate having a top surface, and a bottom surface opposite to the top surface;

a light emitting diode for emitting light towards the dichroic filter, wherein the light emitting diode is disposed on the top surface of the substrate;

a reflector being tube-shaped and having first and second open ends wherein the first open end is disposed on the top surface of substrate surrounding the light emitting diode, and the second open end is spaced apart from the top surface of the substrate, the reflector reflecting the light emitted by the light emitting diode; and a projection screen located at one side of the dichroic filter;

wherein one portion of the light that is emitted by the light emitting diode, reflected by the reflector, and within a predetermined frequency range is passed through the dichroic filter;

wherein another portion of the light that is emitted by the light emitting diode, reflected by the reflector and outside the predetermined frequency range is refracted by the dichroic filter;

wherein the portion of the light that is passed through the dichroic filter exits from the second open end of the reflector having a viewable angle that is substantially from 39 degrees to 90 degrees, wherein the viewable angle is an angle between two extremes of a sector formed by the light when viewing the lamp from the side, wherein the two extremes of the sector formed by the light irradiate on the projection screen at a first predetermined height on the projection screen;

wherein the other portion of the light that is refracted by the dichroic filter exits from the second open end of the reflector and irradiates on the projection screen at a second predetermined height thereon, wherein the first predetermined height is a greater distance from the top surface of the substrate than the second predetermined height.

3. The lamp of claim 2, wherein the portion of the light that is within the predetermined frequency range and passed through the dichroic filter dichroic filter and the other portion of the light that is outside the predetermined frequency range and refracted by the dichroic filter generate at least two colors of light on the projection screen.

4. The lamp of claim 1, wherein the portion of the light that is within the predetermined frequency range and passed through the dichroic filter dichroic filter and the other portion of the light that is outside the predetermined frequency range and refracted by the dichroic filter generate at least two colors of light on the lampshade.

* * * * *